(12) United States Patent
Jensen

(10) Patent No.: US 8,540,254 B2
(45) Date of Patent: Sep. 24, 2013

(54) DEVICE AND METHOD FOR THE TRANSPORT OF OBJECTS/GOODS

(76) Inventor: Peder Jensen, Örebro (SE)

( * ) Notice: Subject to any disclaimer, the term of this patent is extended or adjusted under 35 U.S.C. 154(b) by 0 days.

(21) Appl. No.: 13/318,510

(22) PCT Filed: Mar. 31, 2010

(86) PCT No.: PCT/SE2010/050362
§ 371 (c)(1),
(2), (4) Date: Nov. 8, 2011

(87) PCT Pub. No.: WO2010/132008
PCT Pub. Date: Nov. 18, 2010

(65) Prior Publication Data
US 2012/0049475 A1     Mar. 1, 2012

(30) Foreign Application Priority Data
May 13, 2009  (SE) ........................ 0900643

(51) Int. Cl.
*B62B 5/00*      (2006.01)
(52) U.S. Cl.
USPC ........................ 280/47.28; 280/79.7
(58) Field of Classification Search
USPC ................ 280/47.131, 47.17, 47.28, 47.29, 280/47.34, 79.11, 79.7; 414/444
See application file for complete search history.

(56) References Cited

U.S. PATENT DOCUMENTS

| | | | |
|---|---|---|---|
| 3,744,812 A | * | 7/1973 | Langhausen ............... 280/35 |
| 4,335,990 A | * | 6/1982 | Apter et al. ............... 414/457 |
| 4,491,334 A | | 1/1985 | Tarbell |
| 4,570,954 A | | 2/1986 | Mintz |
| 5,575,609 A | | 11/1996 | Monkhorst |

(Continued)

FOREIGN PATENT DOCUMENTS

| | | |
|---|---|---|
| DE | 29701713 U1 | 7/1998 |
| LU | 54610 A | 12/1967 |

OTHER PUBLICATIONS

International Search Report and Written Opinion (mailed Apr. 22, 2010).

*Primary Examiner* — John Walters
*Assistant Examiner* — Brian Swenson
(74) *Attorney, Agent, or Firm* — Jeffrey S. Melcher; Manelli Selter PLLC

(57) ABSTRACT

The present invention relates to a method and a device for the manual transport of objects/goods, preferably tables, beds and the like, which object comprises a flat-shaped part extending in the horizontal or vertical direction during use, wherein the transport of said objects takes place by means of a transport device comprising a platform (1), which at its bottom side is provided with at least three wheels (2) intended to enable movement/transport of the transport device with the platform (1) in a horizontal position, and which platform (1) at its upper side is provided with at least three supports (3, 4), and wherein the method implies that said object is turned, so that its flat-shaped part is positioned in a vertical position on the upper side of the platform (1) before the movement/transport, wherein, before the turning of the object is commenced, said supports (3, 4) are adapted in such a way that the platform (1) may be arranged at the object and thereafter turn said object 90°, wherein the platform (1) takes a horizontal position with said object loaded and supported on the upper side of the platform (1). The invention also relates to a runner device and a coupling device.

9 Claims, 8 Drawing Sheets

(56) References Cited

U.S. PATENT DOCUMENTS

| | | | |
|---|---|---|---|
| 5,584,399 A * | 12/1996 | King | 211/41.15 |
| 5,788,251 A * | 8/1998 | Johnson | 280/43.17 |
| 6,626,631 B1 | 9/2003 | Malakiman | |
| 8,348,287 B1 * | 1/2013 | Smith | 280/79.7 |
| 2009/0096180 A1 * | 4/2009 | Christen et al. | 280/47.34 |

* cited by examiner

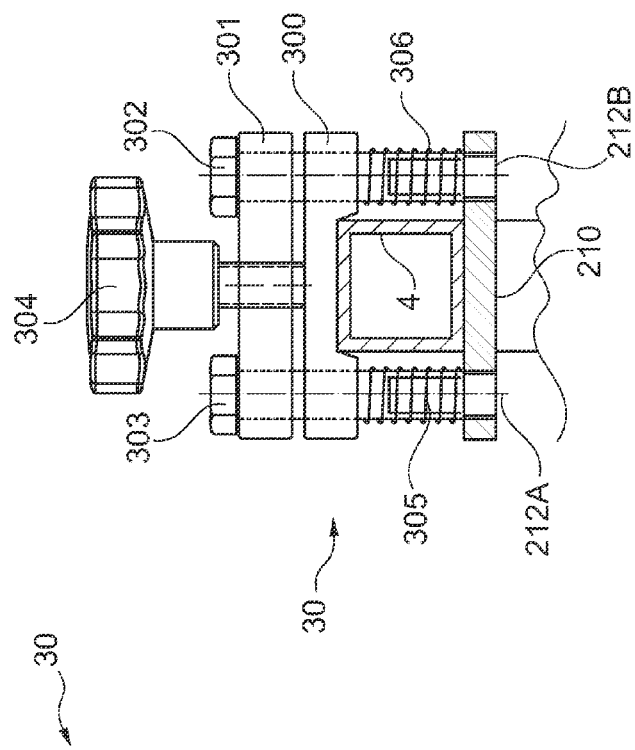
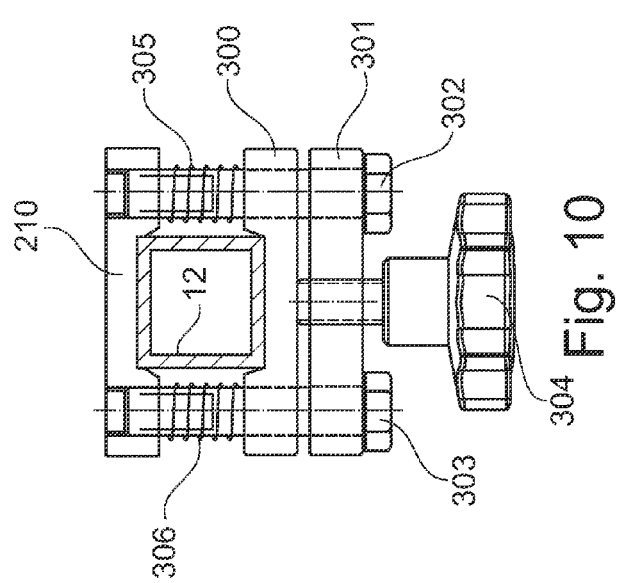
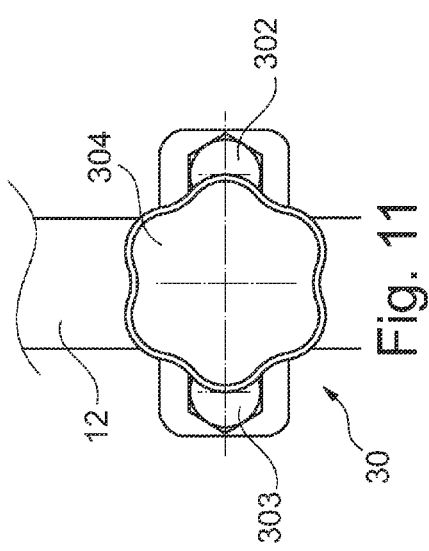

DEVICE AND METHOD FOR THE TRANSPORT OF OBJECTS/GOODS

CROSS-REFERENCE TO RELATED APPLICATIONS

This application is a national stage entry under 35 U.S.C. 371 of International Application No. PCT/SE2010/050362, filed 31 Mar. 2010, designating the United States. This application claims foreign priority under 35 U.S.C. 119 and 365 to Swedish Patent Application No. 0900643-8, filed 13 May 2009. The complete contents of these applications are incorporated herein by reference.

TECHNICAL FIELD

The present invention relates to a method for manual transport of objects/goods, preferably tables, beds and the like, comprising a flat-shaped part on top of legs and supports, which part in use extents horizontally, which method comprises transport of said objects by means of a transport device comprising a platform, which at its bottom side is provided with at least three wheels intended to enable movement/transport of the transport device with the platform in a horizontal position, and which platform on its upper side is provided with at least three supports, and wherein the method implies that said object is turned so that its normally horizontal flat-shaped part is positioned in a vertical position on the upper side of the platform before movement/transport.

PROBLEM DESCRIPTION

At handling and movement, without the tool/auxiliary means, of for instance writing-tables, tables, beds, conference boards, doors, building boards, etc. the physical load often becomes unbalanced and with a high physical load during the turning moment at the change between a horizontal and vertical position, and vice versa. At a movement through limited spaces such as doors and corridors or when turning around corners the squeezing risk and the unbalanced load are very high.

The objects/goods run a high risk to be damaged at the handling and movement and with a risk for damages also of premises/buildings, i.e. of floors, walls, and in limited spaces, i.e. where other objects are a hindrance, corridors, openings, the rounding of a corner, the risk for damage is very large for the object, the interior and the building without the use of any tool/auxiliary means. It is well known to use trolleys, or the like, in accordance with the pre-characterizing portion of the independent claims, to reduce the strain of manually moving objects, e.g. tables, and that also may make the transport more safe. However, still there is a need for at least two people to assist during turning of the object to be transported. This is of course a disadvantage, especially considering that the transport by means of the trolley may mostly be performed by one single person. Several attempts are known to solve problems within this area, e.g. DE-U-29701713, which shows a device for moving grand pianos wherein a member with wheels are positioned onto the piano and connected to an auxiliary turning support, for more easy turning of the piano. However, this device may not be of assistance for moving less heavy standard furniture, since it is cumbersome to use, i.e. several parts that need to be assembled, and necessitates to bring about a specific turning device.

DISCLOSURE OF THE INVENTION

The object of the present invention is to minimize the problems mentioned above, which is achieved by means of a method according to claim 1.

The transport device/method of the invention is developed to facilitate the handling and movement/transport of unergonomic, heavy and bulky objects/goods, which are difficult to handle, and which often have a flat shape with or without legs and supports intended for use in a horizontal or vertical position. The transport device/method facilitates the adaption of the object/goods to make it possible to move as well as to move/transport it. The invention also relates to further aspects, e.g. a novel runner device, a novel coupling device and also other aspects as will be apparent from the following description.

DESCRIPTION OF THE DRAWINGS

Below, reference is made to the following figures, wherein:

FIG. 9, shows a close-up view of a coupling;

FIG. 10, shows a close-up view of a coupling,

FIG. 11, shows the coupling from another view,

DETAILED DESCRIPTION

Figure 1:
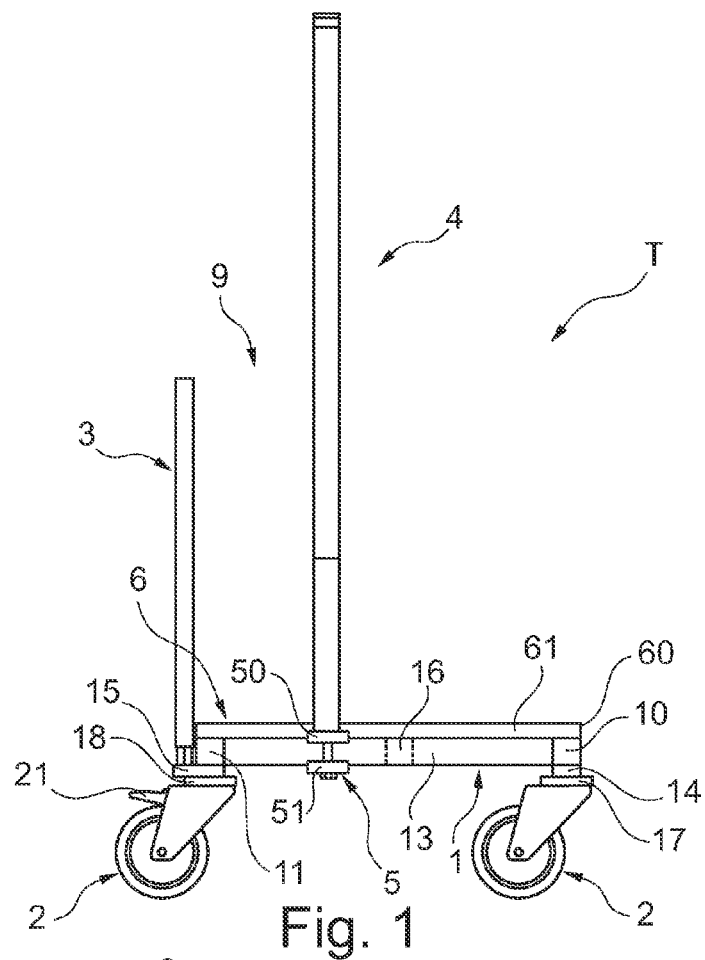
FIG. 1, shows a transport device according to the invention, seen from one short side.

In the enclosed figures there are numbered designations to which reference is made in the text below.

A preferred embodiment of the transport device T, as shown in FIGS. 1-4, comprises the following parts. A platform/frame 1, where the size and measures are adapted to the object and use. Wheels 2, with or without a parking brake. The wheels 2 may be replaced by runners on uneven grounds. First supports 3 with properties for locking and fixing the object. Second supports 4 for the reception of weight and load at the turning of the object and at movement. A coupling/lock 5 to said second supports 4, for the adaption of the best location of the support 4 depending on the size of the object. A plate 6 with a shock absorbing protection for the object at turning and movement, and which plate prevents the object from being damaged by the coupling/lock 5 or the platform/frame 1.

Figure 4:
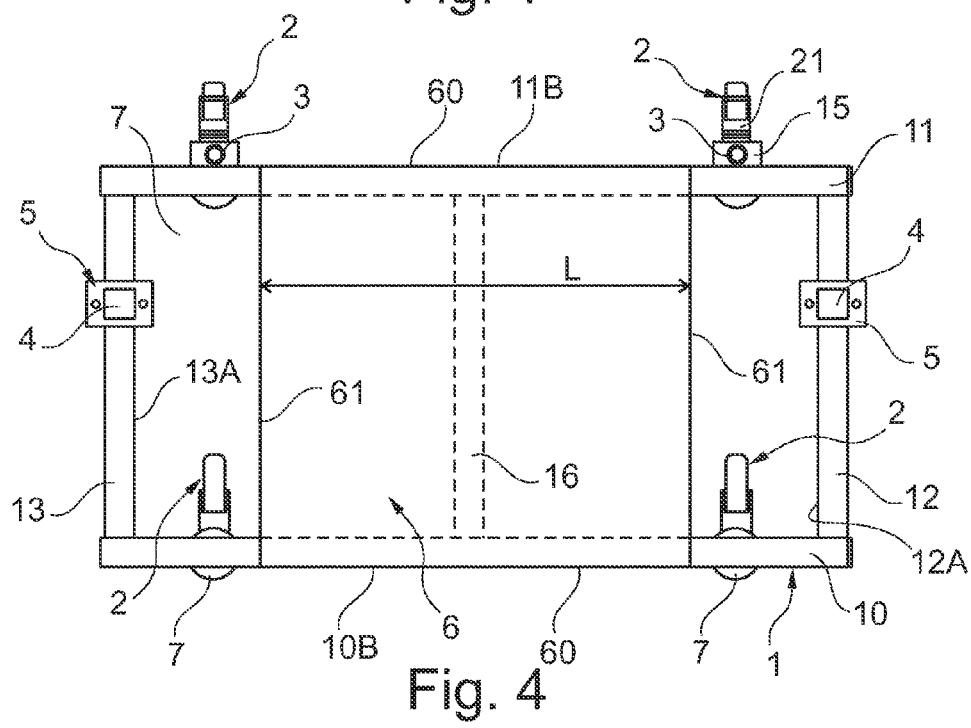
FIG. 4, shows a view from above of the transport device according to the invention.
Figure 2:
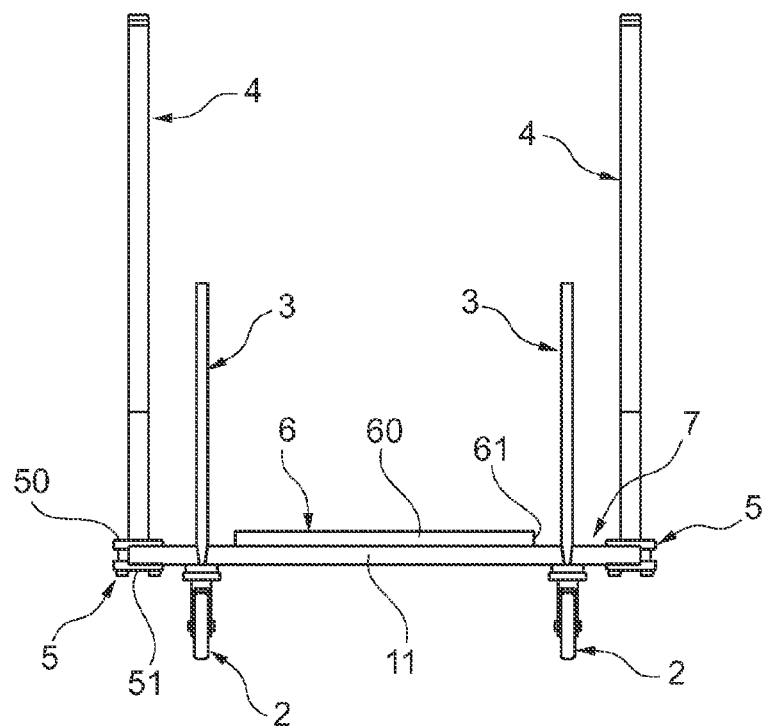
FIG. 2, shows the transport device according to the invention, seen from one long side.
Figure 3:
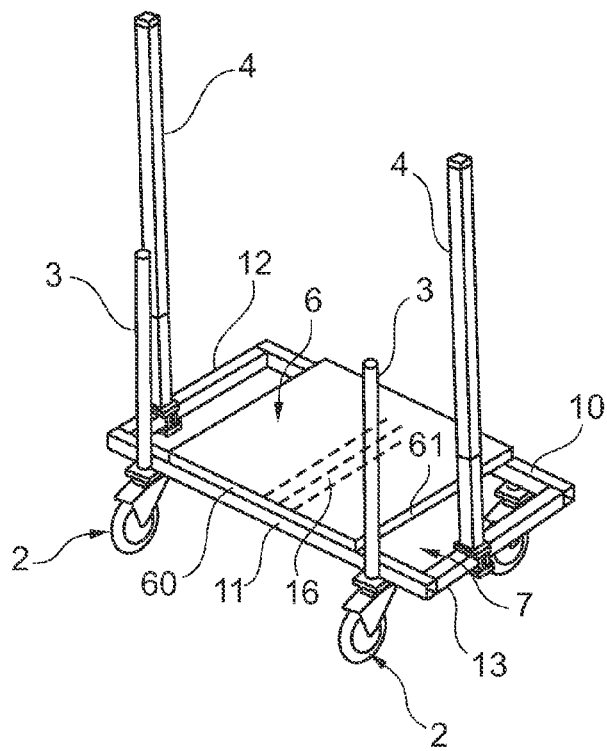
FIG. 3, shows the transport device according to the invention, in a perspective view obliquely from above.

In FIG. 4 it is shown that the platform 1, which forms the basic support structure, is made from a number of beams 10-14, with rectangular cross-section, that are welded together to form a kind of a rectangular frame, and a support beam 16 in the centre of the platform 1. The rectangular shape is due to the fact that two of the beams 10, 11, forming long sides, are substantially longer than those forming the short ends 12, 13. A preferred size of the platform is 400-450 mm wide and 750-800 mm long. The cross-sectional size of the beams 10-13 is preferably in the range 20-40 mm. In the middle of the platform 1, on top of it, there is positioned a rectangular support plate 6. The size of the support plate 6 is chosen such that those sides 60 that are parallel with the long sides 10, 11 of the platform 1, substantially coincide with the outer surface 10B, 11B of the long sides 10, 11. The other sides 61 of the rectangular support plate 6 terminate a distance away from the inner surface 12A, 13A of the short ends 12, 13, such that an open space 7 is formed between each short end beam 12,13 and the facing edges 61 of the support plate 6.

Onto the lower side of the platform 1, along the long sides 10, 11 there are attached fixing members 14, 15, which are welded to achieve a strong fixation. These fixation members 14,15 provide the base support brackets 17,18 (with threaded fixation holes) for the wheels 2. As already mentioned the wheels are of a well known kind that may freely pivot around a vertical axis (sometimes called "non steering wheels"). However preferably at least one pair of the wheels 2 are lockable, e.g. by means of a lever 21. Along that long side 11, where the lockable wheels 2 are positioned the fixation members 15 are larger than those 14 attached to the other long side 10. The reason is that thereby there is obtained a larger portion that may protrude outside of the outer surface 11B of the long side 11, a sufficient distance to provide a threaded through hole (or corresponding attachment means) for attaching the first supports 3. Hereby fixedly positioned supports 3 will be positioned with their inner surface a small distance away from the outer surface 11B of the long side 11. Thanks to this arrangement the support plate 6 will cover all the way across the platform 1, from one long side 10 to the other 11, which facilitates that the object 8 to be transported may not get in contact with the platform 1 but with the support plate 6, which preferably is arranged with a kind of cushioning upper surface 62. Furthermore the gap 7 provided between the support 6 and the short ends 12, 13 will provide easy excess to the couplings 5, which are attached to each one of the short side beams 12, 13, thereby providing sufficient space to lock and unlock the couplings 5, whenever needed.

Now referring to FIG. 1, i.e. a side view of the trolley T, presenting one of the short ends 13 of the platform 1 and the ends of the long sides 10, 11, it is clearly shown that the upper surface 62 of the support plate 6 is at a level well above the upper surface of the platform 1. Further it is shown that the first supports 3 have a length that is about half the length of the second supports 4. The length of the first support is preferably in the range of 350-400 mm and the length of the second support 4 is in a range of 750-800. Thanks to the coupling 5 the second support 4 is releasably attached to one short end beam 12, 13 each. The coupling has an upper coupling part 50 and a lower coupling part 51. Preferably screws are used to clamp the coupling parts 50, 51 tightly around it's short end beam 13 at a desired position. Thanks to the design the gap 9 between the first and second supports 3, 4 may vary from a very small gap, e.g. 30 mm to a very large gap, e.g. 400 mm. Accordingly objects 8 of very varying size maybe handled by means of the invention.

Below, a technique/method is described for the use of the transport device 1.

As an example, reference is made to an object (not shown in the figure), which is used in a horizontal position with legs or supports, e.g. a table, which because of its size, or for any other reason, e.g. a facilitating way may be transported/moved, if it is turned 90° about the longitudinal, horizontal axis before movement/transport.

Step 1: Adapt the second supports 4 to the size of the object by means of the coupling/lock 5.

Step 2: Mount/push the transport device 1 onto the object, wherein the first supports 3 are placed on the upper side and the second supports 4 on the bottom side of the flat shaped part of the object. Push the tool 1 as far as to abutment against the plate 6 (on the upper side of the frame 1). Cheque the fit of the second supports 4 with the locks 5.

Step 3: Lock the parking brake of the wheels 2, in a vertical position, below the supports 4.

Step 4: At the opposite side of the object, as compared to the transport device, i.e. opposite to the mounted transport device, the object is lifted and the turning is commenced (about a longitudinal horizontal axis). The weight of the transport device facilitates the commencement of the turning and the shape of the object determines the angle of inclination before the wheels 2 in Step 3 stop the turning. The object is balanced and continued turning takes places by adding less force which then has to be reversed at the end of the turning to stop the turning of the object.

Step 5: Loosen the parking brake of the wheels 2, which were locked in Step 3 and start movement/transport.

After the movement the object is restored in the opposite order of the steps described above, i.e. 5-1: Loosen the parking brake becomes lock the parking brake, etc.

In FIGS. 5A-5D there are shown in sequence how the invention is being used when moving an object 8, here in a form of a conventional table, having a horizontal plate 80 and vertical legs 81. Firstly, either the second supports 4 are prearranged to form a desired gap 9 between the supports 3, 4, or they may be fixed at desired positions after having positioned the trolley T onto the object 8. Thanks to the design there is no need to create any clamping force between the supports 3, 4 against the object 8, but there may be a rather spacey gap 9 still obtaining the desired functionality in accordance with the invention.

Figure 5A:
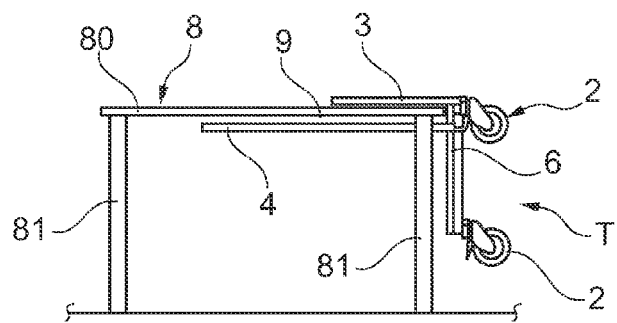
FIGS. 5A-5D, shows in sequence how the invention is being used when moving an object.
Figure 5B:
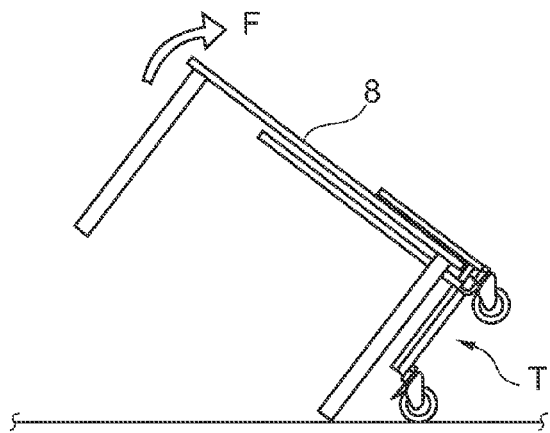
Figure 5C:
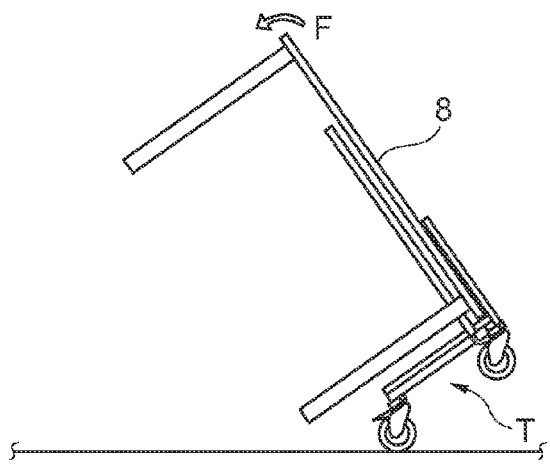
Figure 5D:
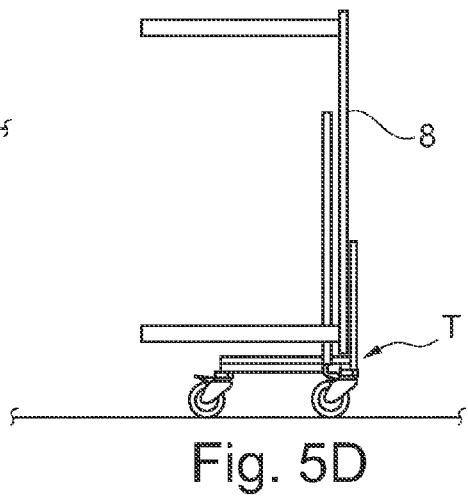

Once the trolley 3 (with the second supports fixedly positioned) has been lifted up and pushed onto the horizontal part 80 of the object 8, as far as possible, i.e. contacting the edge of the horizontal plate 80 with support plate 6 (as shown in FIG. 5A) it will safely remain in that position due to a momentum being created by the weight of the heavier platform part, forcing the second support 4 to be in contact with the underside of the horizontal plate 80. Hence a pivot point will be obtained between the outer upper edge of the horizontal plate 80 and the first. Thereafter one person may easily move the object by means of the invention. Firstly the person gets around to the other side of the object 8 and starts pivoting the object 8 by lifting at the opposite side compared to where the trolley T is positioned. The object will then start pivoting around the leg ends of that pair adjacent the trolley T. Thanks to the design of the invention there is no risk for the trolley 3 to slide off from the object 8 during the pivoting motion. One reason is that thanks to the design the lower most wheels 2 will be positioned rather close to the floor, implying that the wheels 2 will touch the floor after a rather limited lifting/pivoting motion of the object 8 (see FIG. 5 B). From this point and onwards, the weight from the object 8 will be wholly loaded onto the trolley T via the support plate 6 and the second supports 4. Once it has pivoted a beyond a certain point the load from the object will create a pivoting force that strives to put the platform 1 of the trolley 3 in horizontal position. In order to obtain a controlled "landing" of the trolley 3 with the object 8 it is recommended to apply a retaining force (see FIG. 5 C) on to the object 8 during the later phase of the turning of the object 8. Once the platform is again in a horizontal position (see FIG. 5 D) the object 8 and the trolley 3 may easily be moved.

In order to make the pivoting action even easier it is preferable to use lockable wheels 2 for that pair of wheels 2 that will touch the ground first. As is well known there exist standard wheels of this freely pivoting kind, wherein the wheels may be locked against rotation of the wheel and also against pivoting around its vertical axis. When using such wheels and locking them both against pivoting and rotation it is extra easy to pivot the object 8 with the trolley T since the person will then not need to counteract any possible relative motion between the wheels 2 and the floor, but obtain fixed pivot points by the locked wheels 2.

Objects used in a vertical position, e.g. conference boards, doors, etc. are mounted on a transport device 1 standing at the ground by locking the parking brake of the wheel 2 and adjusting the other supports 4 to the correct distance for adaption to the object. Thereafter, the object is lifted or turned, i.e. the vertical axis of the object is turned 90° (the axis becomes horizontal) down into the transport device between the supports 4 and 3. In the last stage of the mounting the platform 1 will balance the weight from the object and facilitate the handling of the object.

An object, which because of its weight requires handling by several persons or a lifting device, may be handled by mounting the transport device 1 onto the object between the supports 3 and 4 at a suitable level before the 90° turning of the vertical axis. At the end of the turning the wheels 2, which are locked by the parking brake, will balance the weight from the object before all wheels load the ground. After movement/transport the object is restored to the vertical position in a reversed order according to the above. The tool/auxiliary means is constructed so that the supports 3 and 4 are easy to demount and mount, which increases the ability/accessibility to use the technique/method in small as well as large spaces.

Figure 6:
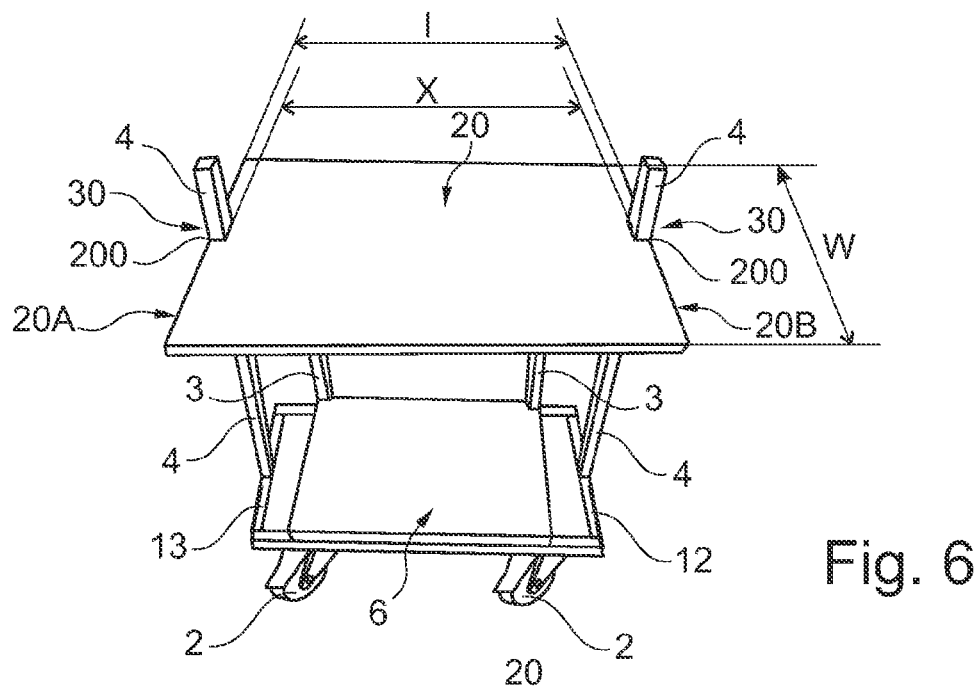
FIG. 6, shows the transport device according to the invention, with a workplane attached to it.

In FIG. 6 is shown a workplane 20 that may be used together with the trolley T with the purpose to have a flexible load plane. The workplane 20 has a length L in about the same size as the long sides 10,11 of the platform 1 and a width w that preferably is longer than the short ends 12,13 of the platform 1, preferably the same length as the long sides 10,11 of the platform 1. However, w may be shorter than shown and have the same width w as the short ends 12,13, depending on specific needs. On two sides 20 A, 20 B the workplane 20 has cut outs 200 in size to fit the supports 4. Two couplings 30 (not shown in FIG. 6) provides releasable attachment of the workplane 20 to the supports 4 at suitable height. This workplane 20 may be used to prevent heavy lift when moving e.g. archive folders or cardboards. Thanks to the cut outs 200 the short side edges 20 A, 20 B of the workplane 20 will be in line with the outer sides of the short side beams 12,13 and also be provided extra support (eliminating flipping) against the supports 4.

Figure 7:
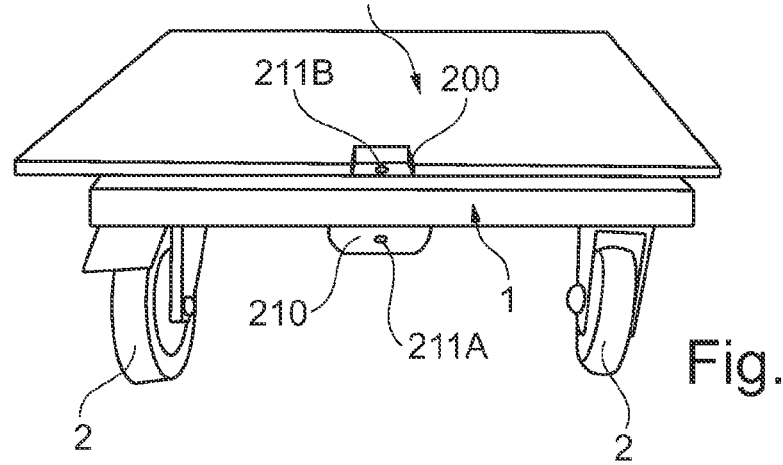
FIG. 7, shows the transport device according to the invention, seen from one short side with a workplane lying on top of the frame.

FIG. 7 shows how the workplane 20 may be placed direct on top of the platform 1 in need of a bigger transport carrier. Further, if moving the workplane 20 along the short ends 12,13, preferably away from that beam 11 having the brackets 15 to enable use of the fixed supports 3, then on one side of the short beams there will be provided free space to mount the supports 4, giving an even more flexible wagon for moving e.g. cardboards, stacking chairs, etc. Below the platform 1 an attachment means 210 of the workplane 20 is protruding, which by means of threaded holes 211-212 facilitate fixing of the workplane 20 by use of couplings 30 described below.

Figure 8:
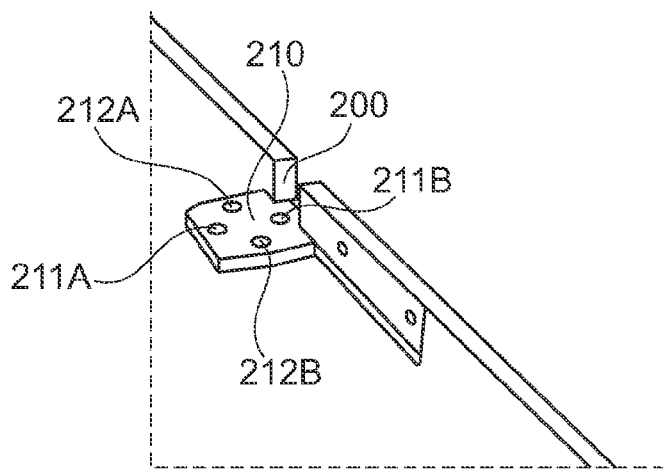
FIG. 8, shows a close-up view of the attachment mean of the workplane.

FIG. 8 shows that the attachment means 210 preferably has four through holes (preferably threaded holes) 211 A, 211 B, 212 A, 212 B one horizontal pair 212 A,B and one vertical pair 211 A,B intended to cooperate with the coupling 30.

FIG. 9 shows the coupling 30 in a close-up view attached to the workplane 20, via the horizontal hole pair 212 A,B to clamp the support 4. The coupling 30 has first coupling half 300 and a coupling base part 301. Two screws 302, 303 protrudes through non-threaded holes in the two coupling parts 300,301 and into the two threaded through holes 212 A,212 B of the attachment means 210 which forms the second coupling half. Between the first coupling half 300 and the second coupling half 210, around the screws 302,303 there are arranged springs 305,306 that urge a releasing force to the coupling 30, in connection with moving the workplane 20 to a suitable height. A third screw 304 penetrates through a threaded hole in the middle of the coupling base part 301 to enable pressing against the first coupling half 300. To move the workplane 20 in height the screw 304 is loosened whereafter the force from the springs 305,306 will press the first coupling half 300 away from the support 4 and loosen the grip such that the workplane 20 can be moved to a desired height. When the workplane 20 is in a desired place the screw 304, which is arranged with a large grip to provide easy manual handling, is tightened until it is fixed to the support 4 again.

The coupling 30 may also be used to (instead of having it loose) adjustably attach the workplane 20 to the platform 1 as seen in FIGS. 10 and 11, by the use of the vertical through holes 211 A, 211 B, whereby the attachment means 210 of the workplane 20 forms the second coupling half.

Figure 12:
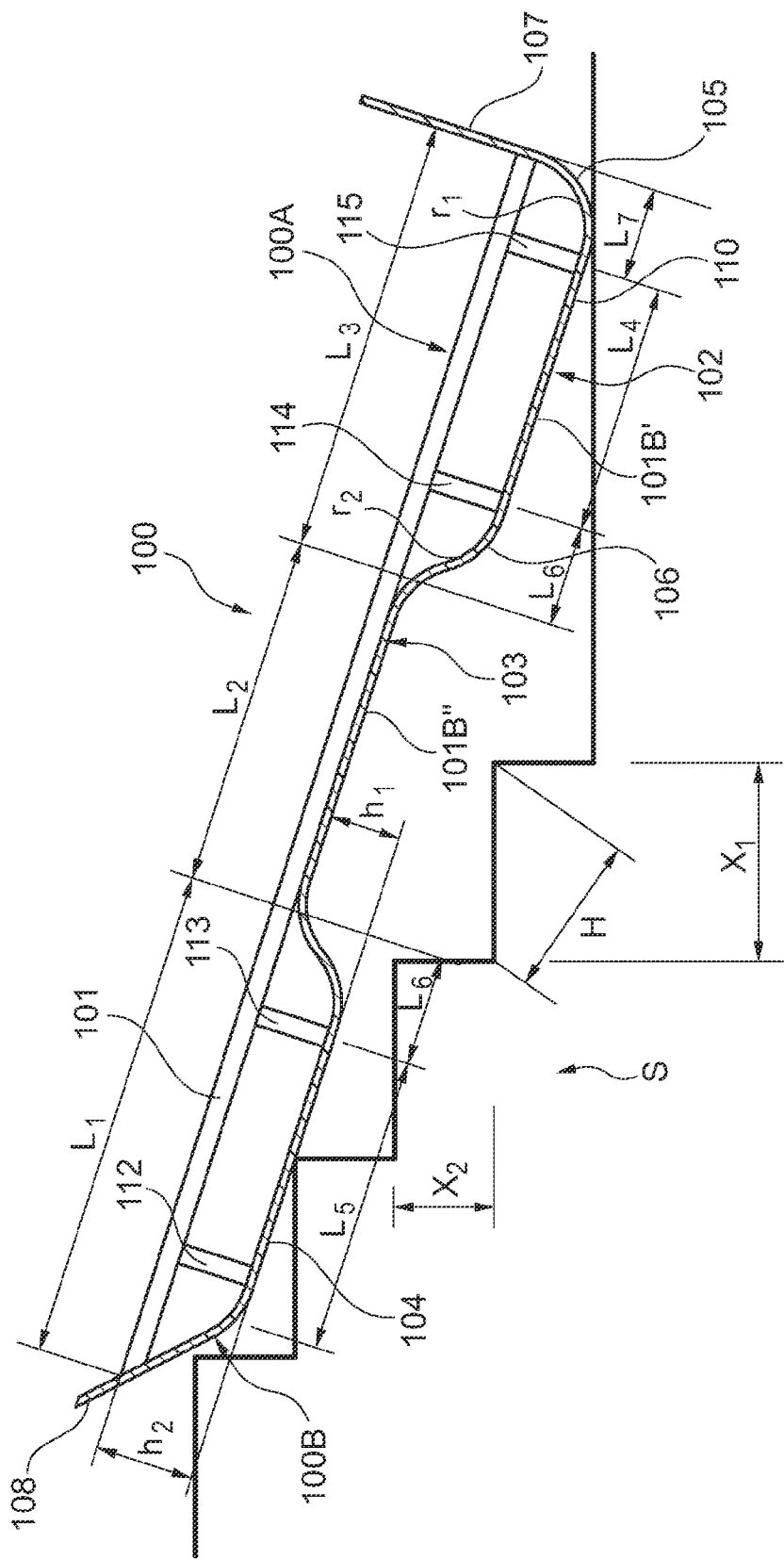
FIG. 12, shows a runner device, seen in a side view, according to a further aspect of the innovation.

In FIG. 12 there is shown side view of a runner device 100 that may be used together with the trolley T in accordance with the invention, but which runner assembly 100 may also be used together with other devices. As a consequence it is foreseen that a divisional application may be filed for this runner device 100 without any connection to the trolley T, but independently claiming the unique features of the runner assembly 100.

As seen in the side view the runner assembly 100 presents a profile comprising a substantially planar upwardly facing support surface 100 A formed by a base 101 and below that a sliding arrangement 102, 103, 104 presenting a continuous sliding surface 100B. The sliding arrangement comprises a front runner part 104, an intermediate runner part 103 and rear runner part 102. The front 104 and rear 102 runner parts present similar shapes in profile and therefore merely one of these parts will be described more in detail.

A rear (or front) runner part 102 has a side profile that may be divided into three portions, i.e. one intermediate portion 110 extending substantially straight lined and two transition portions 105, 106 at each side of the intermediate portion 110. The length L4 of the intermediate portion 110 is longer or exactly the same length (preferably about +1-30%) as the hypotenuse H of a normal step in a stairway, where the runner device 101 is to be used. The distance $h_2$ between the upper face of the base plate 101 and the outer surface 100 B of the intermediate portion 110 substantially corresponds to the length $x_2$ of the vertical catheter in a step in a stairway where the runner device is to be used. On each side of the intermediate piece 110 there are formed transition portions 105, 106, having horizontal extensions L6, L7 that are substantially smaller than the extension L4 of the intermediate portion 110, such that L6 and L7 respectively are in the range of 0.3-0.5 L4. These portions 105, 106 form smooth transitions between the different levels 101 B', 101 B" of the sliding surface 100 B of the runner device 100. In the shown embodiment the main part of the transition portions 105,106 extends in an angle of about 45°. At the intersection, moving from the 45° extension to a horizontal part 101 B', 101 B" the transition portions 105,106 have a radius $r_1$, $r_2$ that are in the interval 80-140 mm, preferably 100-120 mm, which approximately implies that $r_1 \approx r_2$; $0.6 \, x_2 < r_1 < 0.9 \, x_2$.

The sliding surface of the portion 106 nearest to the middle of the runner device 100 first forms a convex outer surface, then a 45° straight line that near the base 101 transforms into a concave portion which converges with the surface 101 B" of the intermediate part 103, i.e. substantially in level with the lower part of base frame 101. The other transition portion 105 first forms a convex outer sliding surface 100 B that converges with a vertical rear end 107 of the runner device, which rear end 107 preferably presents an extension 107 that protrudes a distance above (preferably at least about the same as $h_2$) the upper surface 101A of the base frame 101. Thanks to the vertical extension 107 the runner device 100 may be stably positioned in a vertical position. The front part 104 also presents an extension 108 that protrudes above the upper surface 101 A, but extending at an angle, about 45°.

The middle part 111 presents a part of the runner device 100 where the base frame 101 and the sliding part are in direct contact with each other, thereby providing a further straight lined portion of the sliding surface 100 B, but at a level 101 B" close to the base frame 101. The horizontal extension L2 of this middle part 111 is preferably somewhat smaller than the horizontal extension L1, L3 of the front part 104 and rear part 102 respectively. In a preferred embodiment L2 is about 0.7-0.9 L1. The horizontal extension L1 of the front part 104 and the horizontal extension L3 of the rear part 102 are substantially the same, e.g. ±5%.

Further it can be noted that there are vertical support legs 112, 113, 114, 115, positioned substantially to coincide with the transition point between the intermediate portion and the curved portions of the front part and rear part 104, 102 respectively.

Figure 13:
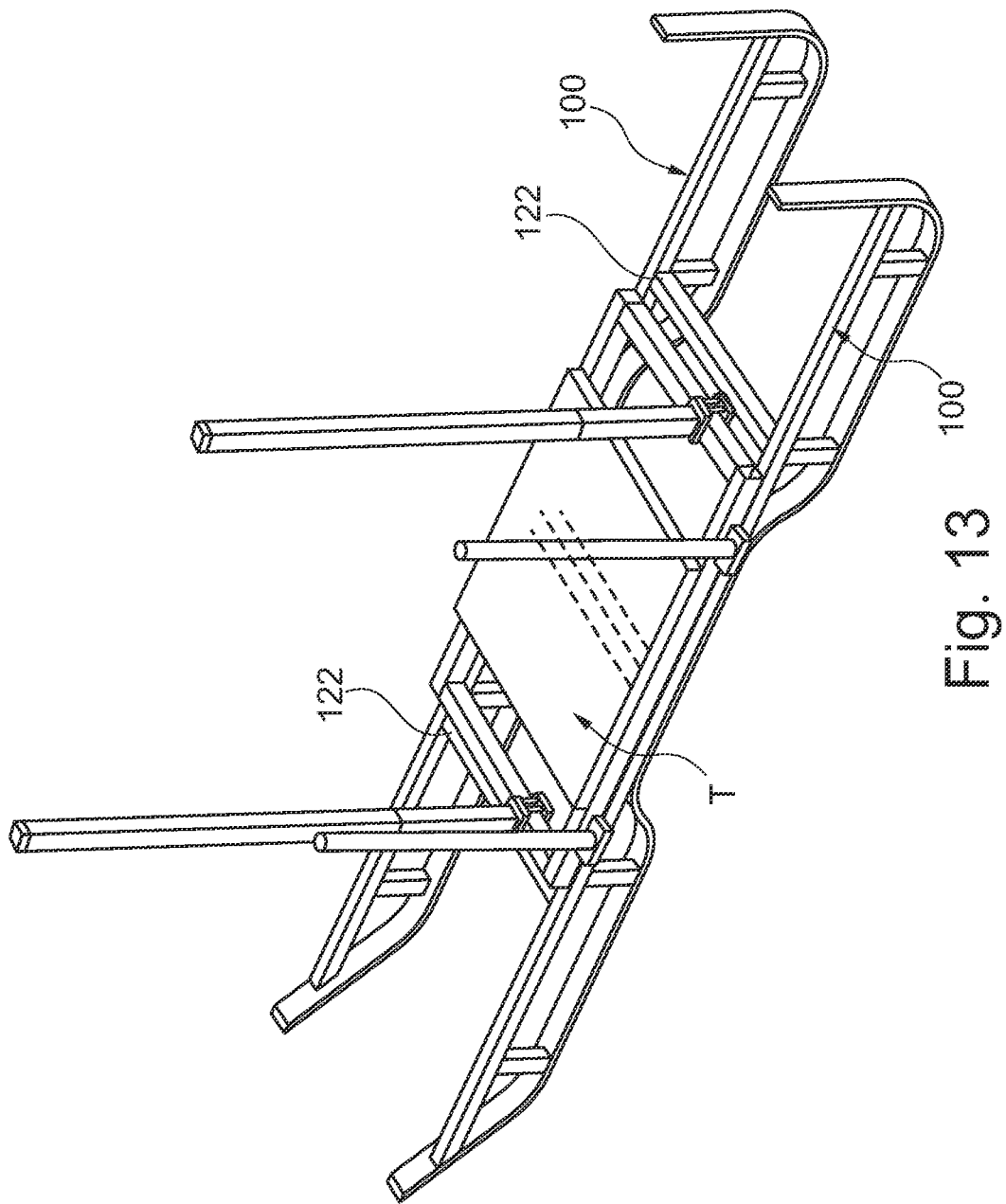
FIGS. 13, 14 shows a runner device assembly intended for use with a Trolley according to the invention.
Figure 14:
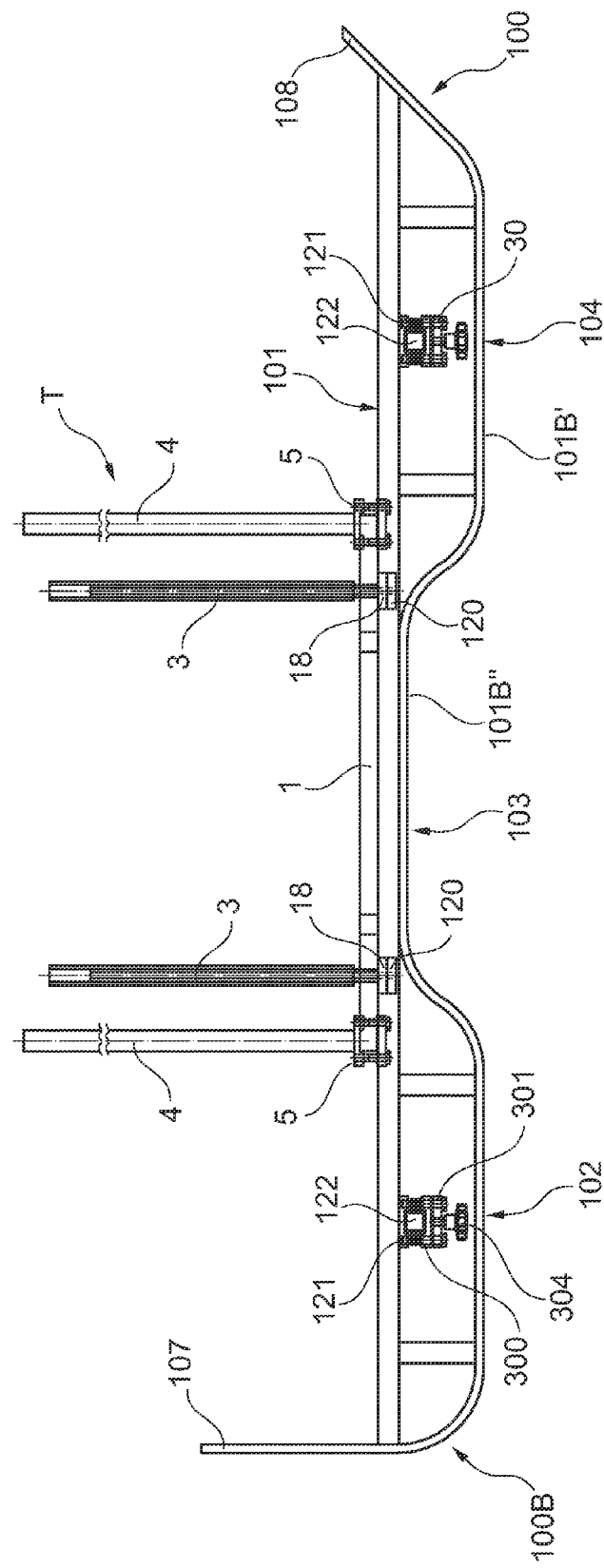

FIGS. 13 and 14 show a trolley T used together with a runner assembly, having two parallel runner devices 100 in accordance with above. The two runner devices 100 are fixed into an assembly by means of welded cross beams 122.

FIG. 14 shows a side view of the trolley T without the wheels 2, releasable attached to two runner devices 100 through attachment means 120 that protrudes horizontally on the outer sides of the runner devices 100. The attachment means 120 are placed to fit with the wheel fixation members 17,18 on the platform 1. The runner device 100 may be equipped with further attachment means 121 (preferably in the form of coupling halfes that fits the coupling 30), on the lower part of the base frame 101 in the front and the rear part, which may be used to fix a support rod 122 extending transversally between two runner devices 100 to make it more stable. Hence in this embodiment the two runner devices 100 are not fixedly attached into an assembly (as shown in FIG. 13), but releasably attached, i.e. providing easy adjustment and also easy dissembly, e.g. to take up little space during storage.

Accordingly, in a preferred embodiment a pair of runner devices 100 are releasable attached to a removal platform 1 in place of the wheels 2, to enable easy removal of objects in stairs. The dimensions on the different parts of the runner device 100 are then adapted after standard sizes of steps but as will be understood by those skilled in the present field of art, numerous changes and modifications may be made to serve its purpose. An essential aspect of the invention is the intermediate lower portion 101 B" of the sliding surface 100 B, which enables the runner device to smoothly enter onto a platform/floor at the upper end of a stairway (or vice versa). In other words thanks to the design there will be no tipping action, but the transition zones 106 will facilitate smooth passages of the upper edge of a stairway, both upwards and downwards. To move heavy and/or bulky objects, e.g. down or up through stairs, is a heavy and sometimes dangerous work that may be considerably easier using a runner device 100 according to the invention. In a preferred embodiment it is adapted to fit to a trolley T to form an assembly as described above.

In use moving upwards, the runners are brought against the stairs and the front part 104 (first via the extension 108 if a higher step) smoothly slides up on the first step, thanks to the inclined transition portion (corresponding to 105), without loosing the equilibrium. Thanks to the length L4 of the straight intermediate portion 110, it will slide along this until step two is reached, whereafter the transition portion 105 smoothly lifts it up onto the second step, etc. When the front part 104 is in level with approximately the fifth step the rear part 102 starts to get in contact with the stairs. Thanks to the length L4 of the intermediate portions 110 loads may be transported in, e.g. stairs, without bumps or irregularity, and thanks to the splitting of the sliding surface 100 B into different levels 101 B',101 B" no tilting/tipping will occur. The function is basically the same uphill a stair as downhill. The sliding surface 100 B of the runner devices 100 that is in contact with the steps may be coated, e.g. with polyurethane to reduce the friction and to protect floor and steps against damages.

As mentioned, in the front 108, the transition portion 105 protrudes a distance above the surface 101 A, preferably about 4-8 cm in a 45° angle to facilitate to slide up on the steps when the runner devices 100 are moved upwards and to avoid jumps in the end of the stairs when going downwards. In the rear 107, the curved portion 105 protrudes about 20-50 cm in a 90° angle above the upper surface 101 A of the base frame 101 to be used as an additional support surface, when there is a need of changing direction of the assembly in places with limited space e.g. when turning the whole assembly at a landing.

The scope of the invention is not limited by the embodiments described above but may be varied within the scope of the appended claims. For instance the skill person realises that many of the details described above may be varied and still fulfil the functionality in accordance with the invention, e.g. such as specific measurements, material of use for producing the trolley and/or the runners, (regarding size, form, composition, etc). Regarding the runners it is evident that the number of runner profiles 100 that are used may vary. For instance in some situations, e.g. in spiral stairs it might be an advantage to only use one runner profile, which then preferably has a wider sliding surface 100 B than if two or three or more runner profiles are used. If using one runner profile it need to be centrally positioned and there is a need of a person to balance the weight of the load, but compared to actually lifting and carrying the load such a method may in many situations be preferred.

The invention claimed is:

1. A transport device, for the performance of a method for the manual transport of objects/goods, which objects comprise a flat-shaped part arranged on top of legs or supports, which part during use extends horizontally, wherein the transport of said objects takes place by means of said transport device comprising:

a platform, which at its bottom side is provided with at least three non-steering wheels arranged to enable movement/transport of the transport device together with the platform in a horizontal position, and which platform at its upper side is provided with at least one first support and at least one second support, which together comprise at least three supports, arranged to support an object at movement/transport, wherein said at least one second support is adjustably attached arranged to enable adaption to the size of the object by means of a coupling/lock, whereby the transport device may be mounted to the object before the movement of the object, in, and in that a pair of said wheels is arranged to act as pivot points, and wherein the method comprises:

turning said object so that its normally horizontal flat shaped part is positioned in a vertical position on the upper side of the platform before the movement/transport, wherein before the turning of the object is commenced said supports are adapted in the same way so that the platform may be arranged vertically relatively the object by arranging at least one of the supports on the upper side of the object, at least one of the second supports at the bottom side of the object and to bring a support plate arranged on the upper side of the platform to abutment against the object, which support plate has its upper surface at a level above the upper surface of the platform and thereafter turn said object 90° and in connection therewith use a pair of said wheels that will touch the ground first as pivot points, wherein the platform resumes the horizontal position with said object loaded and supported on the support plate, wherein the support plate is arranged on the upper side of the platform to abut against the object, which support plate has its upper surface at a level above the upper surface of the platform, and wherein said support plate has a limited length (L) in relation to the length of the platform, to provide gaps between beams provided at the short sides of the platform and the edge of the support plate.

2. The transport device according to claim 1, wherein said second support protrudes a substantially longer distance up from the platform than the first support, and the first support is a fixed support and the second support is a movable support.

3. The transport device according to claim 1, wherein said first support is a fixed support, said fixed support is attached to a fixing member into an area thereof that protrudes outside of the outer periphery of the platform.

4. The transport device according to claim 1, wherein said releasable couplings comprise at least one coupling half that is moveable/lockable by means of manual mechanism.

5. The transport device according to claim 1, wherein there is also provided a workplane having an attachment device arranged to provide clamping of said workplane against an adjustable support.

6. The transport device according to claim 1, wherein said wheels, arranged to act as pivot points, are arranged to be lockable against rotation and pivoting around its vertical axis.

7. The transport device according to claim 1, wherein said objects/goods are tables, beds, and the like.

8. A transport device, for the performance of a method for the manual transport of objects/goods, which objects comprise a flat-shaped part arranged on to of legs or supports, which part during use extends horizontally, wherein the transport of said objects takes place by means of said transport device comprising:

a platform, which at its bottom side is provided with at least three non-steering wheels arranged to enable movement/transport of the transport device together with the platform in a horizontal position, and which platform at its upper side is provided with at least one first support and at least one second support, which together comprise at least three supports, arranged to support an object at movement/transport, wherein said at least one second support is adjustably attached arranged to enable adaption to the size of the object by means of a coupling/lock, whereby the transport device may be mounted to the object before the movement of the object, in, and in that a pair of said wheels is arranged to act as pivot points, and wherein the method comprises:

turning said object so that its normally horizontal flat shaped part is positioned in a vertical position on the upper side of the platform before the movement/transport, wherein before the turning of the object is commenced said supports are adapted in the same way so that the platform may be arranged vertically relatively the object by arranging at least one of the supports on the upper side of the object, at least one of second supports at the bottom side of the object and to bring a support plate arranged on the upper side of the platform to abutment against the object, which support plate has its upper surface at a level above the upper surface of the platform and thereafter turn said object 90° and in connection therewith use a pair of said wheels that will touch the ground first as pivot points, wherein the platform resumes the horizontal position with said object loaded and supported on the support plate, wherein the support plate is arranged on the upper side of the platform to abut against the object, which support plate has its upper surface at a level above the upper surface of the platform, and wherein the workplane presents a larger support surface than said support plate, and wherein said attachment device provides means for also clamping said workplane to the platform.

9. A transport device, for the performance of a method for the manual transport of objects/goods, which objects comprise a flat-shaped part arranged on to of legs or supports, which part during use extends horizontally, wherein the transport of said objects takes place by means of said transport device comprising:

a platform, which at its bottom side is provided with at least three non-steering wheels arranged to enable movement/transport of the transport device together with the platform in a horizontal position, and which platform at its upper side is provided with at least one first support and at least one second support, which together comprise at least three supports, arranged to support an object at movement/transport, wherein said at least one second support is adjustably attached arranged to enable adaption to the size of the object by means of a coupling/lock, whereby the transport device may be mounted to the object before the movement of the object, in, and in that a pair of said wheels is arranged to act as pivot points, and wherein the method comprises:

turning said object so that its normally horizontal flat shaped part is positioned in a vertical position on the upper side of the platform before the movement/transport, wherein before the turning of the object is commenced said supports are adapted in the same way so that the platform may be arranged vertically relatively the object by arranging at least one of the supports on the upper side of the object, at least one of second supports at the bottom side of the object and to bring a support plate arranged on the upper side of the platform to abutment against the object, which support plate has its upper surface at a level above the upper surface of the platform and thereafter turn said object 90° and in connection therewith use a pair of said wheels that will touch the ground first as pivot points, wherein the platform resumes the horizontal position with said object loaded and supported on the support plate, wherein said platform is arranged to interfit with a base frame of a runner device, which runner device comprises a sliding surface divided into a front part, an intermediate part, and a rear part, said front and rear parts extending in the same level at a distance ($h_2$) from said base frame and said intermediate part extending in a level closer to said base frame.

* * * * *